3,272,672
METHOD AND APPARATUS FOR PRESSURE LAMINATING TAPE WOUND ARTICLES
James A. Lampman, Inglewood, Glenn E. Young, Carmel, and Ethridge E. Hardesty, Pine Valley, Calif., assignors to Swedlow, Inc., a corporation of California
Filed June 22, 1962, Ser. No. 204,510
7 Claims. (Cl. 156—189)

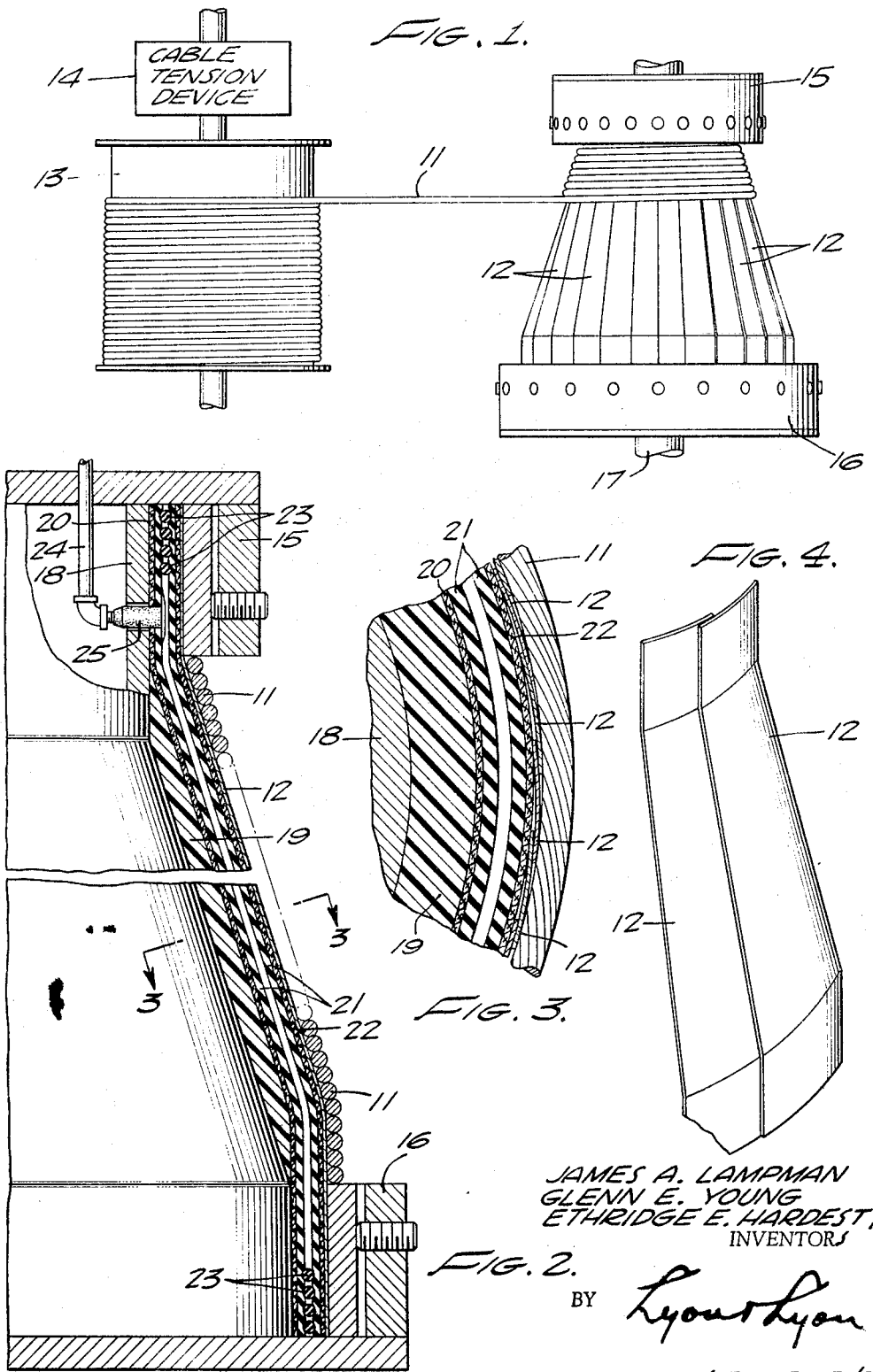

The present invention relates to a process and apparatus for pressure laminating. More particularly, the present invention relates to a process and apparatus for pressure laminating which are suitable for the production of massive articles.

The conventional method which has been employed for the production of moderately sized articles having cylindrical or conical cross sections, such as missile nozzle sections, comprises winding a tape onto a mandrel having the desired configuration, pressure curing the tape, and machining. The tapes used in this conventional process generally comprise a substrate such as silica fabric or glass fibres which substrate has been impregnated with a phenolic resin such as phenol-formaldehyde condensation products or phenol-formaldehyde-silane reaction products. The pressure curing of the wound tape generally requires pressures ranging from about 500 p.s.i. to about 1500 p.s.i. and heat in excess of 320° F. The pressure curing step is ordinarily performed in a hydroclave, i.e., a vessel filled with a liquid which is subjected to heat and pressure. While this process has been found satisfactory for moderately sized articles, the new "generation" of missiles and rockets which are presently being developed require nozzles which are of greatly increased size, e.g. on the order of 300 inches in diameter or more.

Although it is undoubtedly possible that a hydroclave having an inside diameter of more than 300 inches and capable of withstanding more than 1000 p.s.i. could be designed and produced, it is believed that no such hydroclave has yet been produced. The problem involved in the production and use of such a hydroclave would, of course, be manifold. First, a steel or other metal shell having the required pressure resistance, including a safety factor which ordinarily has a value of about 4 to 1, would have to be devised. Second, a sealing device which would withstand the tremendous internal pressures in the vessel would have to be devised. Third, the consequences of a structural failure in such a vessel would be so severe that great skill, time and expense would have to be devoted to the operation and maintenance thereof. The present invention obviates all of these difficulties and permits the fabrication of massive laminates in an easy, simple and inexpensive manner.

It is a principal object of the present invention to provide a process and apparatus for pressure laminating wherein a pressure vessel such as a hydroclave or autoclave is not required.

It is another object of the present invention to provide a process and apparatus for pressure laminating wherein the tape winding and pressure curing step may be performed without moving the mandrel or uncured laminate.

It is a further object of the present invention to provide a process and apparatus for pressure laminating wherein the pressure is exerted by the force of a wound cable or the like.

It is a still further object of the present invention to provide a process and apparatus for pressure laminating wherein the pressure is exerted by a wound cable or the like acting in conjunction with a series of caul plates and a flexible sleeve.

It is still another object of the present invention to provide a process and apparatus for pressure laminating wherein the pressure is exerted by a wound cable acting in conjunction with a series of caul plates, a flexible diaphragm and hydraulic pressure exerted in the interior of the diaphragm.

Other objects and advantages of the present invention will be readily apparent, it is believed, from the following detailed description of preferred embodiments thereof.

Briefly, the present invention comprises a process and apparatus for pressure laminating wherein a mandrel is wound with a tape composed of material which may be pressure cured. The tape is then covered with a flexible sleeve or, preferably, a flexible diaphragm. A series of caul plates is then positioned around the flexible sleeve or diaphragm. A cable is then wound in spiral fashion in at least one layer around the caul plates and tension exerted thereon. Heat is applied in conjunction with the pressure exerted by the cable and pressure curing is accomplished in a simple and easy manner. When a diaphragm is used, hydraulic fluid is forced into the diaphragm, preferably after the cable has been wound, to exert additional pressure in a controlled manner.

In the drawings:

FIGURE 1 illustrates the cable being wound around the caul plates.

FIGURE 2 illustrates, in partial vertical cross section, the mandrel after it has been wound with the tape and cable, with the flexible diaphragm and caul plates interposed between the tapes and cable.

FIGURE 3 illustrates, in a cross section taken on line 3—3 of FIGURE 2, the same elements as those illustrated in FIGURE 2.

FIGURE 4 illustrates pictorially a pair of caul plates as they would appear after being assembled.

Referring now to FIGURE 1, cable 11 is shown being wound around caul plates 12 which cooperate to form a wall. The cable is supplied from spool 13, which spool is provided with a tension device 14. Caul plates 12 are held in place by clamps 15 and 16. The mandrel which supports caul plates 12 is mounted for rotation on axle 17.

FIGURE 2 illustrates a preferred embodiment of the present invention as it would appear assembled on the mandrel. As indicated, mandrel 18 supports wound tape 19. A bleeder cloth 20 separates tape 19 from diaphragm 21. Bleeder cloth 22, in turn, separates diaphragm 21 from caul plates 12. Diaphragm 21 is provided with O-rings 23 which seal the outer edges thereof. Cable 11 is wound in at least one layer around caul plates 12. Caul plates 12 are firmly held against mandrel 18 by clamps 15 and 16. Conduit 24 is connected to a source of hydraulic pressure (not shown) and is attached to nozzle 25 which communicates with the interior of diaphragm 21.

FIGURE 3 illustrates, in a cross section taken on line 3—3 of FIGURE 2, mandrel 18, wound tape 19, bleeder cloth 20, diaphragm 21, bleeder cloth 22, caul plates 12 and cable 11.

FIGURE 4 illustrates a pair of caul plates 12 as they would appear after having been assembled.

According to the present invention, massive laminates which may be used as rocket nozzles are formed by winding a tape capable of being pressure cured around mandrel 18. These tapes may comprise a matrix of woven silica, glass fibres, asbestos, etc., impregnated with a phenolic resin such as a phenolic-formaldehyde condensation product or a phenolic-formaldehyde-silane reaction product. However, it is to be understood that any tape capable of being pressure cured may be used in the practice of the present invention. In accordance with good engineering practice, although not absolutely essential, a bleeder cloth 20 is provided on the surface of wound tape 19. The bleeder cloth may be made of any coarse fabric and functions to absorb substances which may be squeezed out of the tape during compression as well as volatiles which are driven off by the heat applied during the curing step. In a preferred embodiment of the present invention, a flexible diaphragm 21 is positioned over bleeder cloth 20. The upper and lower ends of the diaphragm may be sealed in any suitable manner, e.g., with O-rings 23. The interior of diaphragm 21 is connected to a source of hydraulic pressure through conduit 24 and nozzle 25. Bleeder cloth 22 is positioned over diaphragm 21, and caul plates 12 are positioned over bleeder cloth 22. This assembly is held firmly in place by suitable clamping means such as clamps 15 and 16. Cable 11 is then wound around caul plates 12, thereby placing the assembly under compressive force. The wound cable is preferably applied in more than one layer. This procedure is very effective in preventing slippage of the cable along the length of the caul plates because the additional layer, or layers, tend to wedge between the cables adjacent the caul plates should these latter cables separate, thereby preventing further separation.

The wound cable 11 is capable of withstanding tremendous pressures, such as those which are necessary for pressure curing. The ultimate pressure is then applied by exerting hydraulic pressure in any conventional manner on the interior of diaphragm 21. In order to accomplish pressure curing, the pressure is applied while the assembly is in a heated oven, or similar heating means. In general, pressures of from about 500 p.s.i. to about 1500 p.s.i., and usually about 1000 p.s.i., and a temperature of about 320° F. or more are used It has been found that oblative materials are particularly well suited for use where capability to withstand extremely high temperatures is necessary. It has also been found that the use of high pressures during fabrication maximizes the oblative properties of the materials. Therefore, the present invention makes possible the use of as high a pressure as is necessary to obtain the best possible oblative material. The laminates of oblative material produced according to the present invention are ideally suited for use as rocket nozzles.

It is, of course, necessary that the mandrel used in the present invention must be strong enough to withstand the pressures exerted thereon during pressure curing. It has been found that such mandrels may be produced simply by thickening the walls thereof to an extent sufficient to withstand the pressure to which the mandrel is to be subjected. The process and apparatus of the present invention may be employed to produce articles having almost any configuration. The article may be conical, as illustrated in the drawings, cylindrical, parabolic, etc. The mandrel and caul plates are shaped such that they conform to the desired configuration.

Although it is preferred to use hydraulic pressure in the present invention, it has been found that the cable alone may be used to exert the entire pressure to which the assembly is to be subjected. When the invention is practiced according to this embodiment, diaphragm 21 is replaced by a simple flexible sleeve. The process is otherwise carried out in the same manner as that previously described.

It will be readily apparent to those skilled in the art that the present invention permits the fabrication of massive laminates which must be subjected to high pressure and heat in an unexpected simple and economical manner. The conventional hydroclave type of vessel is eliminated, as well as the necessity for moving the uncured laminate from the winding apparatus to the hydroclave. Furthermore, the cable used in the practice of the present invention is, of course, reuseable and is not restricted to any maximum size as would be the case with an expensive hydroclave. The apparatus of the present invention also possesses the distinct advantage of being easy to operate and easy to maintain, in marked contrast with the hydroclave previously used.

It is also to be understood that the present invention may also be used for the fabrication of rocket nozzles and the like which are not of massive size. There is neither an upper limit nor a lower limit on the size of article which may be produced according to the present invention.

The pressure cured product of the present invention may be machined and filament wound in the conventional manner if desired. The present invention is particularly suited to the production of rocket nozzles and similar articles. However, it is to be understood that the present invention may be used for any purpose in which it is desired to exert pressure or pressure and heat.

It will further be understood that various resins and molding compounds may be used in the present process. Thus, in place of phenolics, other resins such as epoxies, novalacs and others known to those skilled in the art can be used. Also, it will be apparent that other lay-up procedures than tape application can be used, such as, for example, the application to the mandrel of pre-impregnated fibrous reinforcing material in bulk form utilizing a suitable pre-molding form around the mandrel.

Having fully described the present invention, it is to be understood that it is not to be limited to the specific details set forth, but is of the full scope of the appended claims.

We claim:

1. A process for pressure laminating comprising spirally winding a pressure curable tape around a mandrel, surrounding said tape with a flexible sleeve, surrounding said sleeve with caul plates, spirally winding at least one layer of cable around said caul plates, and exerting tension on said cable.

2. The process of claim 1 wherein said tape is subjected to heat while said cable is under tension.

3. The process of claim 1 wherein said tape comprises a matrix impregnated with a phenolic resin.

4. A process for pressure laminating comprising spirally winding a tape around a mandrel, surrounding the surface of said tape with a flexible diaphragm, surrounding said diaphragm with a series of caul plates, spirally winding at least one layer of cable around said caul plates, maintaining said cable under tension, subjecting said diaphragm to hydraulic pressure and subjecting said tape to heat simultaneously with the step of subjecting said diaphragm to hydraulic pressure.

5. The process of claim 4 wherein said tape comprises a matrix impregnated with a phenolic resin.

6. The process of claim 5 wherein said tape is heated to a temperature of at least about 320° F. and is subjected to a pressure of at least about 500 p.s.i.

7. The process of claim 6 wherein said pressure is in the range of from about 500 p.s.i. to about 1500 p.s.i.

References Cited by the Examiner

UNITED STATES PATENTS

| | | | |
|---|---|---|---|
| 913,720 | 3/1909 | Gammeter | 18—6 |
| 1,432,531 | 10/1922 | Chandler | 156—173 |
| 1,954,183 | 4/1934 | Schlesinger | 156—425 X |
| 2,101,252 | 12/1937 | Guinzburg | 18—6 |
| 2,205,112 | 6/1940 | Wallace | 18—6 |
| 2,457,504 | 12/1948 | Snoke | 156—285 X |
| 2,723,426 | 11/1955 | Pelley | 156—285 |
| 2,743,759 | 5/1956 | Snow et al. | 156—143 |

EARL M. BERGERT, *Primary Examiner.*

P. DIER, *Assistant Examiner.*